(12) United States Patent
Yoshikawa et al.

(10) Patent No.: US 10,992,198 B2
(45) Date of Patent: Apr. 27, 2021

(54) MOTOR

(71) Applicant: Panasonic Intellectual Property Management Co., Ltd., Osaka (JP)

(72) Inventors: Yuichi Yoshikawa, Osaka (JP); Keiichiro Nukada, Nara (JP); Yasushi Kato, Kyoto (JP); Hirokazu Yamauchi, Osaka (JP); Mitsuoki Hishida, Osaka (JP)

(73) Assignee: PANASONIC INTELLECTUAL PROPERTY MANAGEMENT CO., LTD, Osaka (JP)

( * ) Notice: Subject to any disclaimer, the term of this patent is extended or adjusted under 35 U.S.C. 154(b) by 0 days.

(21) Appl. No.: 16/476,332

(22) PCT Filed: Nov. 7, 2017

(86) PCT No.: PCT/JP2017/040030
§ 371 (c)(1),
(2) Date: Jul. 8, 2019

(87) PCT Pub. No.: WO2018/135094
PCT Pub. Date: Jul. 26, 2018

(65) Prior Publication Data
US 2020/0044503 A1    Feb. 6, 2020

(30) Foreign Application Priority Data

Jan. 18, 2017    (JP) .............................. JP2017-007011

(51) Int. Cl.
*H02K 3/20*    (2006.01)
*H02K 1/14*    (2006.01)
*H02K 21/16*   (2006.01)

(52) U.S. Cl.
CPC ............... *H02K 3/20* (2013.01); *H02K 1/146* (2013.01); *H02K 21/16* (2013.01); *H02K 2213/03* (2013.01)

(58) Field of Classification Search
CPC .... H02K 1/146; H02K 21/16; H02K 2213/03; H02K 3/12; H02K 3/18; H02K 3/20
(Continued)

(56) References Cited

U.S. PATENT DOCUMENTS

| | | | |
|---|---|---|---|
| 2,085,099 A * | 6/1937 | Jones | H02K 3/12 |
| | | | 310/225 |
| 6,281,612 B1 * | 8/2001 | Asao | H02K 3/12 |
| | | | 29/596 |

(Continued)

FOREIGN PATENT DOCUMENTS

| | | |
|---|---|---|
| CN | 1781232 A | 5/2006 |
| DE | 102012212637 | 1/2014 |

(Continued)

OTHER PUBLICATIONS

International Search Report of PCT application No. PCT/JP2017/040030 dated Feb. 6, 2018.
(Continued)

*Primary Examiner* — Alex W Mok
(74) *Attorney, Agent, or Firm* — McDermott Will & Emery LLP

(57) ABSTRACT

A motor includes a stator including a stator core and teeth respectively protruding from the stator core, and coils respectively wound onto the teeth n (n is an integer of 3 or greater) turns. In a cross section in a first direction representing each of directions of protrusion of the teeth from the stator core, a k-th (k is an integer, 1<k<n) turn of each of the coils lies at a center of a range wound with each of the coils onto the teeth in the first direction. The k-th turn of each of
(Continued)

the coils is greater in cross-sectional area than each of a first turn and an n-th turn.

2 Claims, 4 Drawing Sheets

(58) Field of Classification Search
USPC .......................................................... 310/208
See application file for complete search history.

(56) References Cited

U.S. PATENT DOCUMENTS

| | | | | |
|---|---|---|---|---|
| 6,956,313 | B2* | 10/2005 | El-Gabry | H02K 3/12 |
| | | | | 310/179 |
| 7,291,954 | B2* | 11/2007 | Kashihara | H02K 3/505 |
| | | | | 310/184 |
| 7,726,005 | B2* | 6/2010 | Stroebel | H02K 15/06 |
| | | | | 29/596 |
| 8,575,809 | B2* | 11/2013 | Stiesdal | H02K 3/18 |
| | | | | 310/180 |
| 10,673,293 | B2* | 6/2020 | Lee | H02K 3/12 |
| 2002/0153799 | A1 | 10/2002 | Kurahashi et al. | |
| 2005/0162032 | A1* | 7/2005 | El-Gabry | H02K 3/12 |
| | | | | 310/179 |
| 2005/0275304 | A1* | 12/2005 | El-Gabry | H02K 3/12 |
| | | | | 310/179 |
| 2006/0208594 | A1* | 9/2006 | Kashihara | H02K 3/28 |
| | | | | 310/179 |
| 2007/0194650 | A1* | 8/2007 | Ito | H02K 21/222 |
| | | | | 310/179 |
| 2008/0001494 | A1* | 1/2008 | Endo | H02K 15/022 |
| | | | | 310/254.1 |
| 2008/0136283 | A1* | 6/2008 | Fujii | H02K 3/28 |
| | | | | 310/184 |
| 2015/0188371 | A1* | 7/2015 | Kato | H02K 3/18 |
| | | | | 310/208 |
| 2016/0013692 | A1* | 1/2016 | Wawrzyniak | H02K 15/0407 |
| | | | | 310/208 |
| 2016/0315525 | A1 | 10/2016 | Hongo | |
| 2017/0040859 | A1* | 2/2017 | Langlard | H02K 15/0068 |
| 2020/0287446 | A1 | 9/2020 | Hongo | |

FOREIGN PATENT DOCUMENTS

| | | |
|---|---|---|
| JP | 30-003028 Y | 3/1955 |
| JP | 2003-018779 | 1/2003 |
| JP | 2005-137174 A | 5/2005 |
| JP | 2010-213543 | 9/2010 |
| JP | 5592554 B1 | 9/2014 |
| JP | 6092862 B2 | 3/2017 |
| JP | 6505431 B2 | 4/2019 |

OTHER PUBLICATIONS

Chinese Search Report issued in corresponding Chinese Patent Application No. 201780083410.9, dated Sep. 17, 2020, with English translation.

* cited by examiner

MOTOR

TECHNICAL FIELD

The present disclosure relates to motors. In particular, the present disclosure relates to a structure of coils in a motor.

BACKGROUND ART

Industry motors and on-vehicle motors have been highly demanded in recent years. In particular, a low cost but highly efficient motor has been demanded.

As a method for improving efficiency of a motor, increasing a space factor of coils respectively disposed within slots of a stator has been known. Increasing a space factor of coils can suppress a loss due to a current flowing into the coils when a motor is driven.

As a method for increasing a space factor of coils, such a configuration has been proposed that molded coils made of a copper material are respectively disposed within slots (e.g., see PTL 1).

When coils are produced through molding or forming, for example, the coils have been each made uniform in cross-sectional area to achieve uniform resistance. Meanwhile, heat is a factor of lowering efficiency of a motor. On teeth respectively wound with coils, heat easily accumulates at a center of each of the teeth. However, in coils each having a cross-sectional area made uniform, heat radiation effects due to the coils are concentrated within the cross-sectional areas.

CITATION LIST

Patent Literature

PTL 1: Unexamined German Patent Publication No. 102012212637

SUMMARY OF THE INVENTION

In view of the problems described above, the disclosure has an object of further increasing heat radiation effects due to coils to achieve a highly efficient motor.

To achieve the object described above, a motor according to the present disclosure includes a stator including a stator core and teeth respectively protruding from the stator core, and coils respectively wound onto the teeth n (n is an integer of 3 or greater) turns. In a cross section in a first direction representing each of directions of protrusion of the teeth from the stator core, a k-th (k is an integer, $1<k<n$) turn of each of the coils lies at a center of a range wound with each of the coils onto the teeth in the first direction. The k-th turn of each of the coils is greater in cross-sectional area than each of a first turn and an n-th turn.

With the configuration having the coils each expanded greater in cross-sectional area at a center portion, where heat easily accumulates, of each of the teeth, the coil can average thermal efficiency. Heat radiation effects due to the coils can thus be increased. A highly efficient motor can therefore be achieved.

In the motor according to the present disclosure, the k-th turn of each of the coils may be largest in cross-sectional area among the first to n-th turns. Each of the coils may gradually reduce in cross-sectional area from the k-th turn to the first turn. Each of the coils may as well gradually reduce in cross-sectional area from the k-th turn to the n-th turn.

Another motor according to the present disclosure includes a stator including a stator core and teeth respectively protruding from the stator core, and coils respectively wound onto the teeth m (m is an even number of 4 or greater) turns. In a cross section in a first direction representing each of directions of protrusion of the teeth from the stator core, j-th and (j+1)-th turns (j is an integer, $1 \leq j \leq m-1$) of each of the coils are two turns both lying closest to a center of a range wound with each of the coils onto the teeth in the first direction. Each of the j-th turn and the (j+1)-th turn are greater in cross-sectional area than each of a (j−1)-th turn and a (j+2)-th turn.

With the configuration having the coils each expanded greater in cross-sectional area at a center portion, where heat easily accumulates, of each of the teeth, the coil can average thermal efficiency. Heat radiation effects due to the coils can thus be increased. A highly efficient motor can therefore be achieved.

According to the present disclosure, heat radiation effects due to the coils can be further increased, achieving a highly efficient motor.

DESCRIPTION OF EMBODIMENT

An exemplary embodiment of the present disclosure will be described herein in detail with reference to the accompanying drawings. The preferable exemplary embodiment described below is a substantially mere example, and does not intend to limit the present disclosure, applications, and purposes.

Exemplary Embodiment

Motor Structure

Figure 1A:
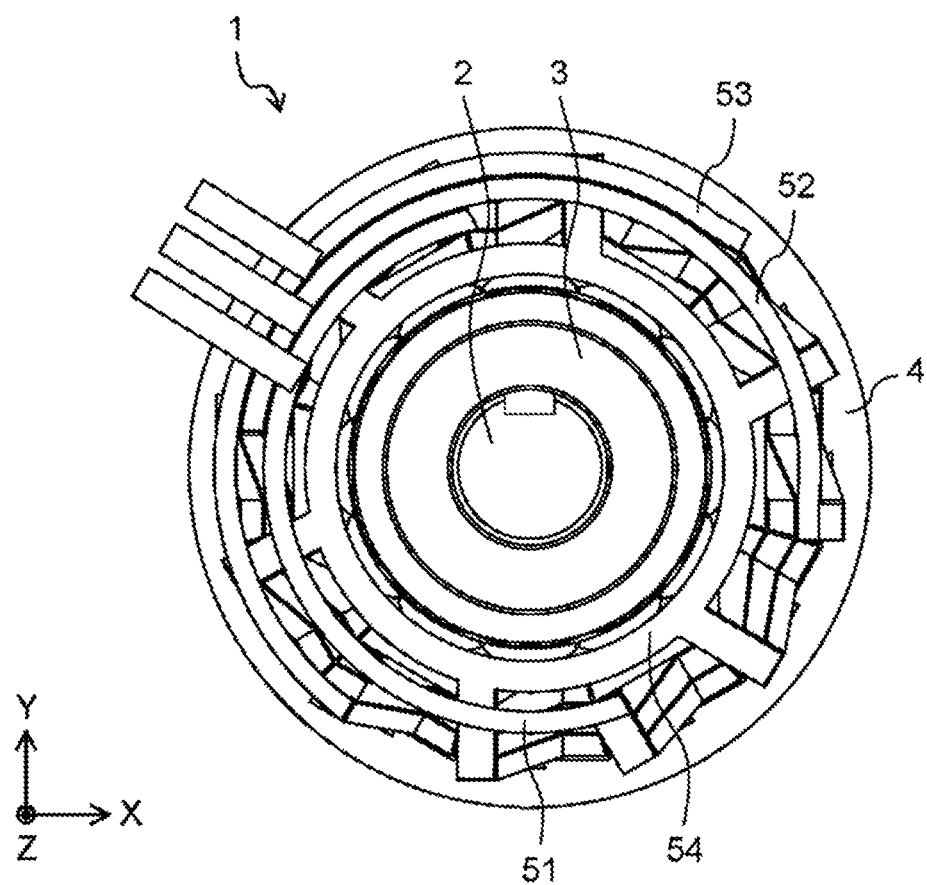
FIG. 1A is a top view illustrating a motor according to an exemplary embodiment.
Figure 1B:
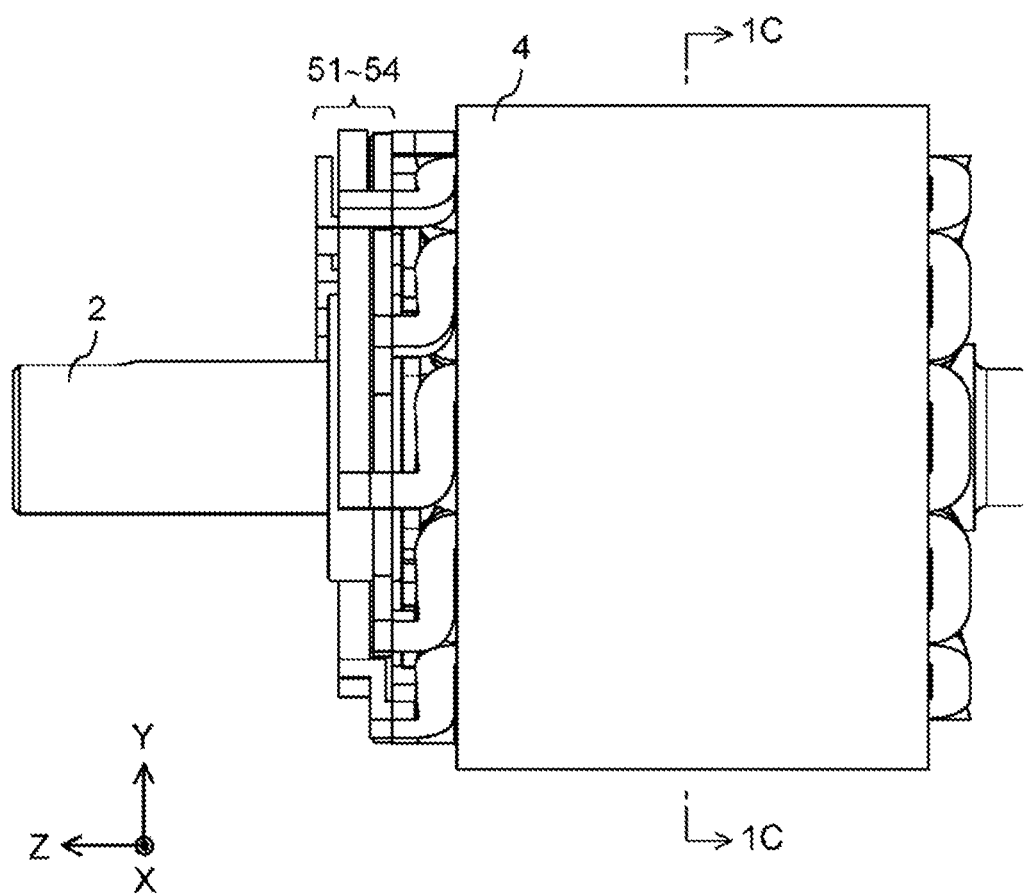
FIG. 1B is a side view illustrating the motor according to the exemplary embodiment.
Figure 1C:
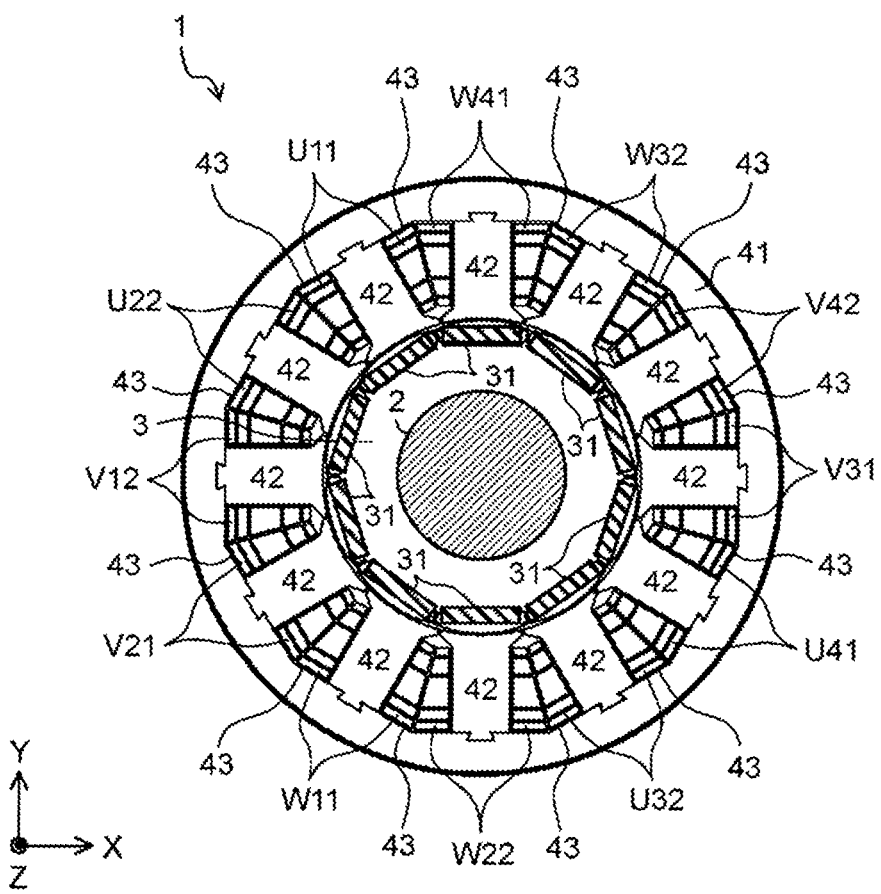
FIG. 1C is a cross-sectional view taken along line 1C-1C in FIG. 1B.

FIG. 1A is a top view illustrating a motor according to an exemplary embodiment. FIG. 1B is a side view illustrating the motor according to the exemplary embodiment. FIG. 1C is a cross-sectional view taken along line 1C-1C in FIG. 1B. However, the views do not illustrate a cover case, for example. Inside of the cover case (not illustrated), motor 1 includes shaft 2, rotor 3, stator 4, coils U11 to U41, V12 to V42, and W11 to W41, and bus bars 51 to 54.

In here, a longer direction (a direction vertical to a paper plane of FIG. 1A) of shaft 2 may sometimes be referred to as a Z-axis direction. Directions orthogonal to the Z-axis direction (directions parallel to the paper plane of FIG. 1A) may sometimes be respectively referred to as an X-axis direction and a Y-axis direction. The X-axis direction and the Y-axis direction are orthogonal to each other.

A term "integrated" or "integrally" denotes a state of an object where not only a plurality of constituent parts are mechanically coupled with each other with bolts or through caulking, for example, but also a plurality of constituent parts are electrically coupled with each other through material coupling such as covalent coupling, ion coupling, or metal coupling, for example, or a plurality of constituent parts are electrically coupled with each other through material coupling after all of the constituent parts are melted.

Rotor 3 is provided to abut an outer circumference of shaft 2. Rotor 3 includes magnets 31 each facing stator 4. Magnets 31 respectively have N-poles and S-poles alternately disposed in an outer circumference direction of shaft 2. In the exemplary embodiment, neodymium magnets are used as magnets 31 used in rotor 3. However, a material and a shape of each of magnets 31 can be appropriately changed in accordance with an output of a motor, for example.

Stator 4 includes stator core 41 having a substantially annular shape, a plurality of teeth 42 provided on an inner circumference of stator core 41 at equal intervals, and slots 43 respectively provided between teeth 42. When viewed in the Z-axis direction, stator 4 is disposed outside of rotor 3 to be away from rotor 3 at a certain gap.

Stator core 41 is die-cut and formed from electromagnetic steel sheets containing silicon, for example, and laminated to each other, for example.

In the exemplary embodiment, rotor 3 includes a total of ten magnetic poles, including five N-poles and five S-poles facing stator 4. A number of slots 43 is 12. However, a number of magnetic poles of rotor 3 and a number of slots 43 are not limited to the numbers described above. A combination of another number of magnetic poles and another number of slots is also applicable.

Stator 4 includes 12 coils U11 to U41, V12 to V42, and W11 to W41. Each of coils U11 to U41, V12 to V42, and W11 to W41 is attached to a corresponding one of teeth 42, and disposed in a corresponding one of slots 43 when viewed in the Z-axis direction. That is, coils U11 to U41, V12 to V42, and W11 to W41 are respectively wound in a concentrated manner with respect to teeth 42. Furthermore, coils U11 to U41 are integrally disposed to bus bar 51, coils V12 to V42 are integrally disposed to bus bar 52, and coils W11 to W41 are integrally disposed to bus bar 53.

In each of symbols UPQ, VPQ, and WPQ representing the coils, a first letter represents one of phases of motor 1 (one of U-phase, V-phase, and W-phase in the exemplary embodiment). A second letter represents an order of arrangement of a corresponding one of the coils in the one of the phases. A third letter represents a direction of winding of the corresponding one of the coils. In the exemplary embodiment, 1 represents a clockwise direction, and 2 represents a counter-clockwise direction. Therefore, coil U11 represents a first coil in an order of arrangement in the U-phase, and a direction of winding is the clockwise direction. Coil V42 represents a fourth coil in an order of arrangement in the V-phase, and a direction of winding is the counter-clockwise direction. A term "clockwise" denotes right-handed rotation when viewed from the center of motor 1. A term "counter-clockwise" denotes left-handed rotation when viewed from the center of motor 1.

Specifically, coils U11, U41 are U-phase coils, whereas coils U22, U32 are U-bar-phase (a direction of a magnetic field is opposite to a direction of a magnetic field generated from a U-phase coil) coils. However, the coils will be collectively referred to as U-phase coils unless otherwise specified. Similarly, coils V12 to V42 and coils W11 to W41 will be respectively collectively referred to as V-phase coils and W-phase coils.

Features of Coil Cross Section

Figure 2:
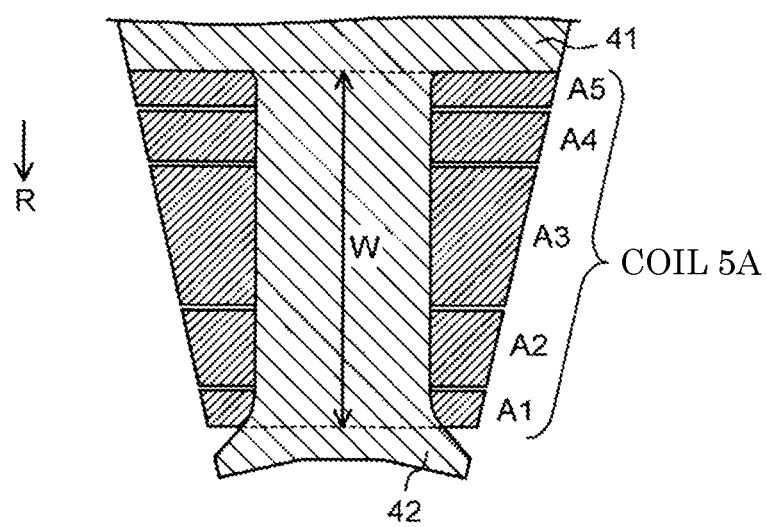
FIG. 2 is a partial enlarged view of FIG. 1C.

FIG. 2 is a partial enlarged view of FIG. 1C. FIG. 2 illustrates one of teeth 42 respectively protruding from stator core 41, and coil 5A wound onto the one of teeth 42. Stator core 41 lies on an outside of the motor. Teeth 42 lie adjacent to a center of the motor. Coil 5A corresponds to one of coils U11 to U41, V12 to V42, and W11 to W41 illustrated in FIG. 1C. Coil 5A is mainly made of one of materials including copper, aluminum, zinc, magnesium, brass, iron, and steel use stainless (SUS), for example.

Each of the directions of protrusion of teeth 42 from stator core 41 is herein referred to as an R direction. FIG. 2 illustrates a cross section in the R direction. In FIG. 2, coil 5A is wound onto the one of teeth 42 five turns. A1 to A5 respectively represent cross sections at a first turn to a fifth turn of coil 5A. Symbols A1 to A5 may respectively represent cross-sectional areas of cross sections A1 to A5.

In the exemplary embodiment, the turns of coil 5A are not made uniform, but vary in cross-sectional area. A range wound with coil 5A onto the one of teeth 42 in the R direction is referred to as range W. In here, cross section A3 at the third turn of coil 5A lies at a center of range W. Cross section A3 at the third turn of coil 5A is greater than each of cross section A1 at the first turn and cross section A5 at the fifth turn respectively lying at both of ends of range W.

In the configuration in FIG. 2, cross section A3 at the third turn of coil 5A is largest among cross sections A1 to A5 at the first to fifth turns. Coil 5A gradually reduces in cross-sectional area from the third turn to the first turn (A3>A2>A1). Coil 5A gradually reduces in cross-sectional area from the third turn to the fifth turn (A3>A4>A5). In other words, coil 5A gradually reduces in cross-sectional area from the center to both of the ends of range W.

As described above, with coil 5A expanded greater in cross-sectional area at the center portion, where heat easily accumulates, of each of teeth 42, coil 5A can average thermal efficiency.

In the exemplary embodiment, the number of turns of each of the coils is specified to, but not limited to, five. The number of turns of each of the coils can be however appropriately changed in accordance with a size or capability, for example, of motor 1.

Figure 3:
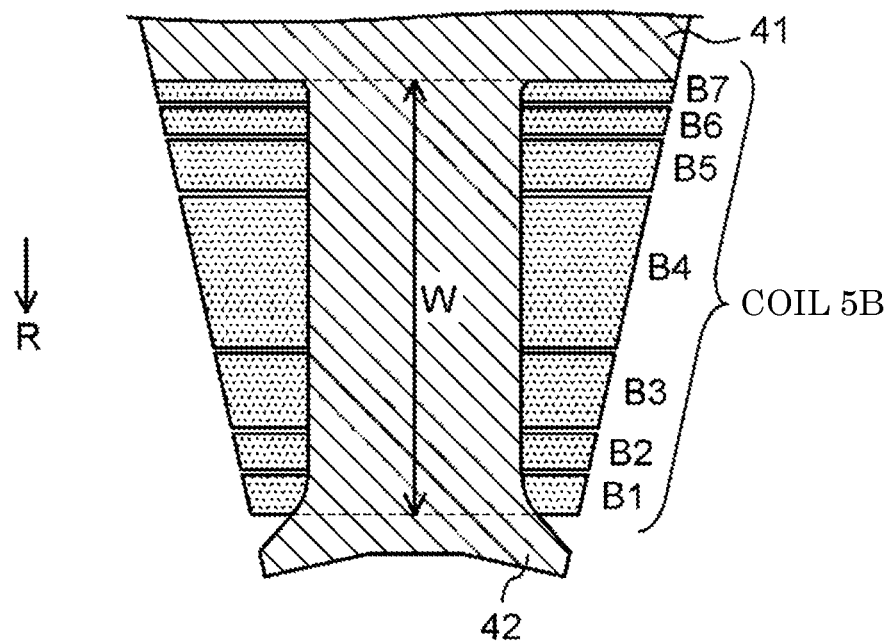
FIG. 3 is a cross-sectional view illustrating an example when a number of turns of each of coils in FIG. 2 is changed.

FIG. 3 is a cross-sectional view illustrating an example when a number of turns of each of the coils in FIG. 2 is changed. FIG. 3 illustrates a configuration when the number of turns of each of the coils is seven. Similar to FIG. 2, FIG. 3 illustrates one of teeth 42 respectively protruding from stator core 41, and coil 5B wound onto the one of teeth 42. Similar to coil 5A, coil 5B corresponds to one of coils U11 to U41, V12 to V42, and W11 to W41 illustrated in FIG. 1C. Coil 5B is mainly made of one of materials including copper, aluminum, zinc, magnesium, brass, iron, and SUS, for example.

Coil 5B is wound onto one of teeth 42 seven turns. B1 to B7 respectively represent cross sections at a first turn to a seventh turn of coil 5B. Symbol B1 to B7 may respectively represent cross-sectional areas of cross sections B1 to B7.

In the configuration in FIG. 3, cross section B4 at the fourth turn of coil 5B lies at a center of range W. Cross section B4 at the fourth turn of coil 5B is greater than each of cross section B1 at the first turn and cross section B7 at the seventh turn respectively lying at both of ends of range W. In the configuration in FIG. 3, cross section B4 at the fourth turn of coil 5B is largest among cross sections B1 to B7 respectively at the first to seventh turns. Coil 5B gradually reduces in cross-sectional area from the fourth turn to the first turn (B4>B3>B2>B1). Coil 5B gradually reduces in cross-sectional area from the fourth turn to the seventh turn (B4>B5>B6>B7). In other words, coil 5B gradually reduces in cross-sectional area from the center to both of the ends of range W.

Even when a number of turns of a coil is other than five and seven, the configuration described herein may be similarly applied. In other words, when a k-th (k is an integer, 1<k<n) turn of each of coils lies at a center of a range wound with each of the coils onto teeth n (n is an integer of 3 or greater) turns, the k-th turn of each of the coils may be expanded greater in cross-sectional area than each of a first turn and an n-th turn.

Figure 4:
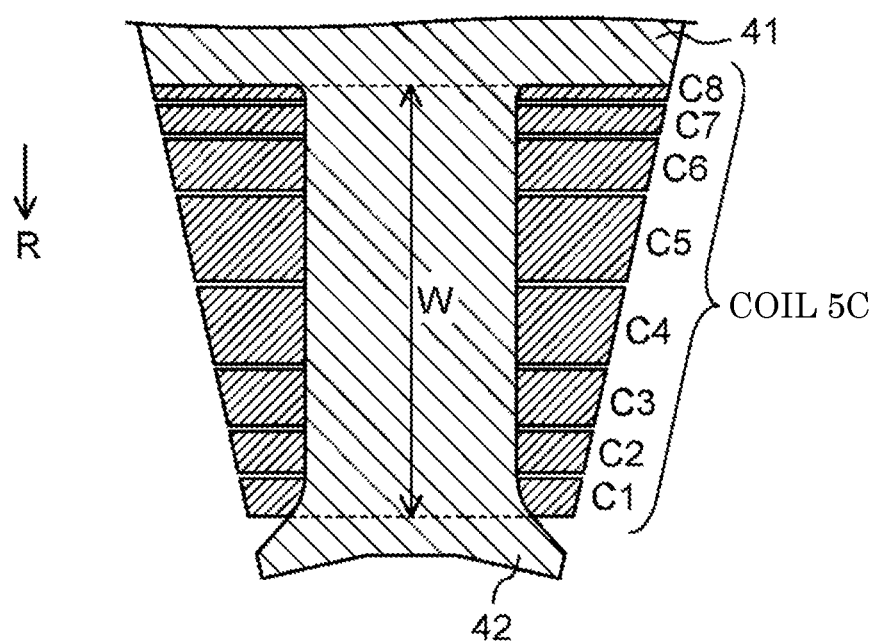
FIG. 4 is a cross-sectional view illustrating an example when the number of turns of each of the coils in FIG. 2 is changed to an even number.

A number of turns may be an even number. FIG. 4 is a cross-sectional view illustrating an example when the number of turns of each of the coils in FIG. 2 is changed to an even number. FIG. 4 illustrates a configuration where a number of turns of each of the coils is eight. Similar to FIG. 2, FIG. 4 illustrates one of teeth 42 protruding from stator core 41, and coil 5C wound onto the one of teeth 42. Similar to coils 5A, 5B, coil 5C corresponds to one of coils U11 to U41, V12 to V42, and W11 to W41 illustrated in FIG. 1C. Coil 5C is mainly made of one of materials including copper, aluminum, zinc, magnesium, brass, iron, and SUS, for example.

Coil 5C is wound onto the one of teeth 42 eight turns. C1 to C8 respectively represent cross sections at a first turn to an eighth turn of coil 5C. Symbols C1 to C8 may respectively represent cross-sectional areas of cross sections C1 to C8.

In the configuration in FIG. 4, two turns of coil 5C lie closest to a center of range W, and are the fourth and fifth turns. In other words, cross sections C4, C5 respectively at the fourth and fifth turns lie closer to the center of range W. Each of cross sections C4, C5 at the fourth and fifth turns is greater than each of cross section C3 at the third turn and cross section C6 at the sixth turn respectively lying outside next to the fourth and fifth turns. Cross-sectional areas C4, C5 may be identical to each other. Otherwise, one of cross-sectional areas C4, C5 may be greater than another one of cross-sectional areas C4, C5.

As described above, with coil 5C expanded greater in cross-sectional area at the center portion, where heat easily accumulates, of each of teeth 42, coil 5C can average thermal efficiency.

Even when a number of turns of a coil is an even number other than eight, the configuration described herein may be similarly applied. In other words, when j-th and (j+1) (j is an integer, 1<j<m−1) turns of each of coils respectively lie closest to a center of a range wound with each of the coils onto teeth m (m is an even number of 4 or greater) turns, each of the j-th turn and the (j+1) turn of the coil may be expanded greater in cross-sectional area than each of a (j−1)-th turn and a (j+2)-th turn.

As described above, motor 1 according to the exemplary embodiment includes stator 4 including stator core 41 and teeth 42 respectively protruding from stator core 41, and coils 5A respectively wound onto teeth 42 n (n is an integer of 3 or greater) turns. In a cross section in a first direction representing each of directions of protrusion of teeth 42 from stator core 41, a k-th (k is an integer, 1<k<n) turn of each of coils 5A lies at a center of a range wound with each of coils 5A onto teeth 42 in the first direction. The k-th turn of each of coils 5A is greater in cross-sectional area than each of a first turn and an n-th turn.

As described above, with coil 5A expanded greater in cross-sectional area at the center portion, where heat easily accumulates, of each of teeth 42, coil 5A can average thermal efficiency. Heat radiation effects due to coil 5A can thus be increased. A highly efficient motor can therefore be achieved.

In motor 1, the k-th turn of coil 5A may be largest in cross-sectional area among the first to n-th turns. Coil 5A may gradually reduce in cross-sectional area from the k-th turn to the first turn. Coil 5A may as well gradually reduce in cross-sectional area from the k-th turn to the n-th turn.

Motor 1 according to the exemplary embodiment includes stator 4 including stator core 41 and teeth 42 respectively protruding from stator core 41, and coils 5C respectively wound onto teeth 42 m (m is an even number of 4 or greater) turns. In a cross section in a first direction representing each of directions of protrusion of teeth 42 from stator core 41, j-th and (j+1)-th turns (j is an integer, 1<j<m−1) of each of coils 5C are two turns both lying closest to a center of a range wound with each of coils 5C onto teeth 42 in the first direction. Each of the j-th turn and the (j+1)-th turn are greater in cross-sectional area than each of a (j−1)-th turn and a (j+2)-th turn.

As described above, with coil 5C expanded greater in cross-sectional area at the center portion, where heat easily accumulates, of each of teeth 42, coil 5C can average thermal efficiency. Heat radiation effects due to coil 5C can thus be increased. A highly efficient motor can therefore be achieved.

INDUSTRIAL APPLICABILITY

With the motors according to the present disclosure, heat radiation effects due to the coils can be increased. Therefore, the present disclosure effectively achieves a low cost but highly efficient motor.

REFERENCE MARKS IN THE DRAWINGS

1: motor
2: shaft
3: rotor
4: stator
5A, 5B, 5C: coil
31: magnet
41: stator core
42: teeth
43: slot
51, 52, 53, 54: bus bar
A1 to A5: cross section at turn of coil 5A
B1 to B7: cross section at turn of coil 5B
C1 to C8: cross section at turn of coil 5C
U11, U22, U32, U41, V12, V21, V31, V42, W11, W22, W32, W41: coil

The invention claimed is:
1. A motor comprising:
a stator including a stator core and teeth respectively protruding from the stator core; and
coils respectively wound onto the teeth n (n is an integer of 5 or greater) turns,
wherein
in a cross section in a first direction representing each of directions of protrusion of the teeth from the stator core, a k-th (k is an integer, 1<k<n) turn of each of the coils lies at a center of a range wound with each of the coils onto the teeth in the first direction,
the k-th turn of each of the coils is greater in cross-sectional area than each of a first turn and an n-th turn,
the k-th turn of each of the coils is largest in cross-sectional area among the first to the n-th turns, and each of the coils gradually reduces in cross-sectional area from the k-th turn to the first turn, and each of the coils gradually reduces in cross-sectional area from the k-th turn to the n-th turn.

2. A motor comprising:
a stator including a stator core and teeth respectively protruding from the stator core; and
coils respectively wound onto the teeth m (m is an even number of 6 or greater) turns, wherein
in a cross section in a first direction representing each of directions of protrusion of the teeth from the stator core, j-th and (j+1)-th turns (j is an integer, $1<j<m-1$) of each of the coils are two turns both lying closest to a center of a range wound with each of the coils onto the teeth in the first direction,
each of the j-th turn and the (j+1)-th turn are greater in cross-sectional area than each of a (j−1)-th turn and a (j+2)-th turn,
the j-th turn at the center of the range and the (j+1)-th turn of each of the coils are largest in cross-sectional area among the first to the n-th turns, and
each of the coils gradually reduces in cross-sectional area from the j-th turn to a first turn, and gradually reduces in cross-sectional area from the (j+1)-th turn to the m-th turn.

* * * * *